Sept. 2, 1958  J. A. GUNDEL ET AL  2,849,756
INSULATION CLIP
Filed July 2, 1953
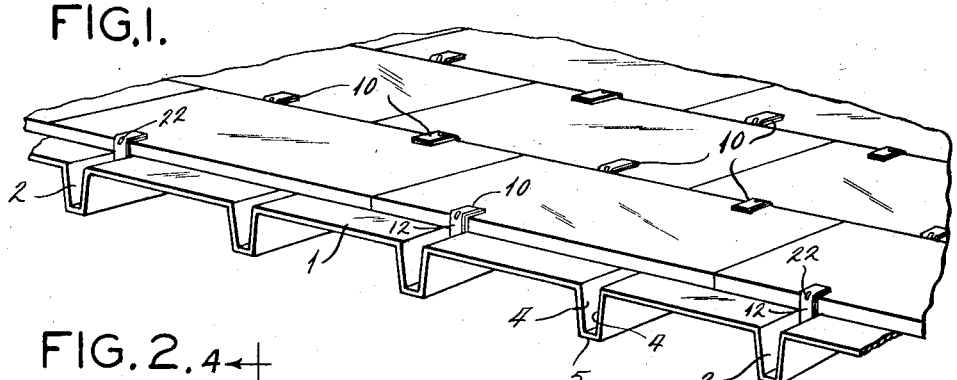
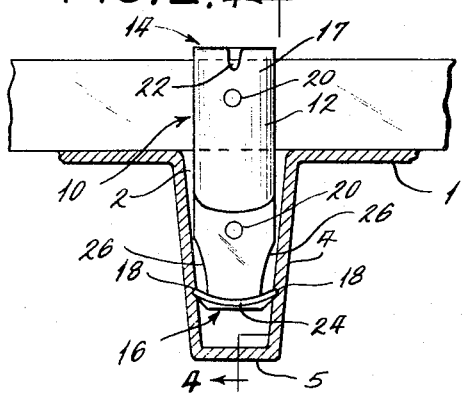
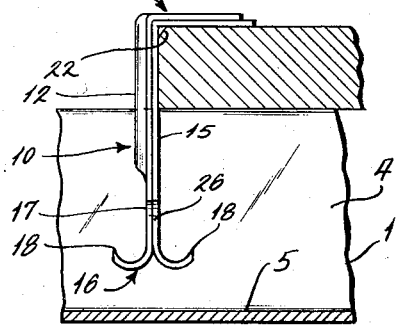
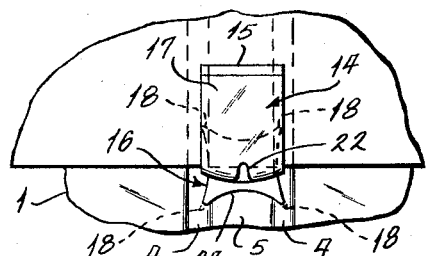
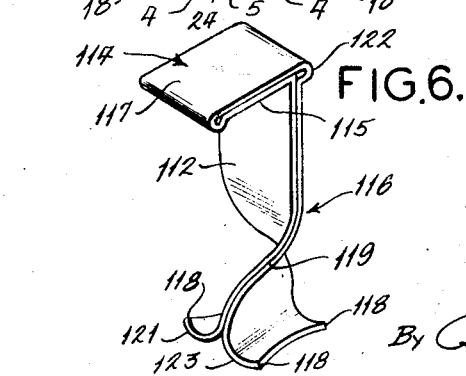
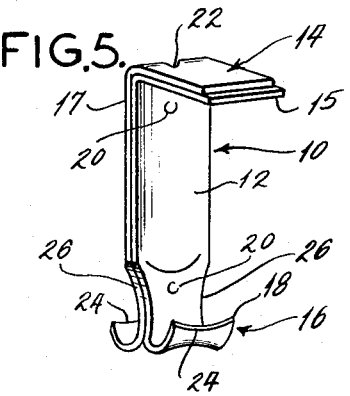
INVENTOR
JOHN A. GUNDEL
NICHOLAS B. BARSHA
By Bruninga and Sutherland
ATTORNEYS United States Patent Office 2,849,756
Patented Sept. 2, 1958

2,849,756

INSULATION CLIP

John A. Gundel, Kirkwood, and Nicholas B. Barsha, Glendale, Mo., assignors to Airtherm Manufacturing Company, St. Louis, Mo., a corporation of Missouri Application July 2, 1953, Serial No. 365,656

2 Claims. (Cl. 20—4)

This invention relates to clips for mounting insulation or other sheet material on decking, and in particular on channeled or fluted steel decking.

It has been common practice in the past to secure sheets of insulation or other sheet material to decking by driving embossed metal-piercing clips through the sheet material and through the decking. The disadvantages of this method of fastening are several-fold. As the clip is driven through the insulation, the protruding boss frequently breaks out a part of the sheet material. Furthermore, the clip not only makes a hole in the otherwise watertight decking but, being made of metal and extending from the outside to the inside of the building, the entire clip, in cool weather, frequently attains a temperature below the dew point of the interior of the building, causing objectionable dripping of condensed moisture from the ends of the clips.

One of the objects of this invention is to provide a non-piercing clip for use with channeled decking.

Another object is to provide such a clip which is secured with such limited contact with the decking as practically to eliminate heat transfer from the building through the clip.

Another object is to provide such a clip which is cheap, easy to manufacture, simple to install and effective to secure sheet material.

In accordance with this invention, generally stated, a clip is provided having a rigid, relatively thin vertical shank, a head offset from the upper end of the shank, and an anchor on the lower end of the shank. The anchor may be provided with sharp, outwardly projecting points, preferably curled upwardly and arranged so as to preclude rotation of the clip and to be effective with the head oriented in any of four cardinal directions.

The clip may be made of two strips of metal, secured together, as by spot welding along the shank, bent over to form the head at one end of the shank, cut away both transversely of and along the edges of the shank at the other end of the shank to define pairs of sharp corners, and the sharp-cornered ends of the two strips curled in opposite directions to form the anchor.

The channels of the channeled decking with which these clips have utility are formed integrally with the decking and serve as strengthening ribs. Each channel is open along its length and its sides slope convergently toward the closed bottom of the channel. The sharp points of the clip are so arranged that the clip can readily be driven down into the channel, but when retraction is attempted, the points dig into the sides of the channel and securely anchor the clips therein.

The only contact between the decking and the clip is at the ends of the sharp points of the anchor so that the heat transfer between the decking and the clip is negligible.

In the drawing, Figure 1 is a view in perspective of channeled decking on which sheets of insulation are mounted by means of the clips of this invention;

Figure 2 is a sectional view showing a clip of this invention in rear elevation within a channel;

Figure 3 is a top plan view of the clip shown in Figure 2;

Figure 4 is a sectional view taken along the line 4—4 of Figure 2;

Figure 5 is a view in perspective of the clip shown in Figures 2–4; and

Figure 6 is a view in perspective of a clip constructed in accordance with another embodiment of this invention.

Referring now to the drawing for an illustrative embodiment of this invention, 1 represents a section of metal decking. The metal decking 1 is provided with a series of open channels 2 formed integrally with the decking. Side walls 4 of the channels 2 slope convergently toward a bottom wall 5. Sheets of insulation 8 are mounted on the plane face of the decking by means of clips 10.

The embodiment of clip shown in Figures 2 through 5 is provided with a shank 12, which is relatively thin as compared with its width. At the upper end of the shank 12 is a head 14. At the lower end of the shank 12 is an anchor 16, having four upwardly curled, sharp points 18.

The clip 10 of this embodiment is made up of two strips of metal, an inside strip 15 and an outside strip 17, secured together by spot welds 20 along the shank 12. The shank 12 is dished through a part of its length to increase its rigidity. The upper ends of the strips 15 and 17 are bent over at right angles to the shank 12 to form the head 14. A reinforcing knee 22 may be embossed in the corner between the head 14 and the shank 12. The lower end of the inner strip 15, is curled upwardly in a direction toward that in which the head 14 tends. The lower end of the outer strip 17, is curled upwardly in a direction away from that in which the head 14 tends. The lower end of each of the strips is cut away in a concave arc 24 to produce the sharp points 18. The points 18 are further defined by cutting away the edges of the strips 15 and 17 in concave arcs 26, extending from the points 18 to a point well up on the shank 12. The cut away portion 26 of the edges of the strips 15 and 17 extend sufficiently far up the shank 12 to provide clearance, so that, when the clip is driven down into a channel 2, the points 18 are able to engage and dig into the sides 4 of the channel, without interference from the shank, as shown particularly in Figure 2.

A clip constructed in accordance with another embodiment of this invention is shown in Figure 6. The clip of that embodiment is made of a single piece of metal strip redoubled upon itself. It is provided with a head 114, made up of an overlying member 117 and an underlying member 115; a shank 112; and an anchor 116. Transverse rigidity is given the clip by extending the overlying member 117 of the head 114 beyond the shank 112, and doubling it back to form a rib 122. Longitudinal rigidity is given the shank 112 by introducing a half-twist 119 therein. Two free ends 121 and 123 of the strip which makes up the clip are curled upwardly to form the anchor 116 and provided with sharp points 118 in much the same way as the anchor 16 of the other embodiment described.

In mounting sheet material on a channeled deck with the clip of the embodiments shown in Figures 2 through 6, the sheet insulation is simply put in position, a clip is inserted in a channel running out from beneath the sheet of insulation, the clip being oriented in such a way that the head extends over the edge of the insulation, and the clip is driven down into the channel until the underside of the head engages the insulation. An anchor for any particular size of channel is proportioned to engage the side walls of the channel when the clip is driven home.

It can be seen that in either embodiment described, the clip can be oriented with its head in either direction parallel with the channel, or either direction perpendicular thereto. However, in the usual case, the head is oriented in a direction parallel with the channel, because the sheets of insulation are rarely proportioned to fit exactly between two channels whereas, as shown in Figure 1, when the clips are oriented as shown in that figure, it does not matter how the edges of the sheet are positioned with respect to the successive channels.

If roofing felt or the like is used as a vapor bond between the decking and the insulation, the location of the channel beneath the felt can easily be determined by touch. In inserting an anchor through the felt, the anchor can be turned so that a sharp edge 24 cuts through the felt and the clip inserted with a kind of rocking motion. When roofing felt or the like is used, pitch is ordinarily applied to the felt, and the pitch applied along the edge of the laid insulation will seal the small cut made by the anchor, through which cut the shank extends.

It can be seen that the decking with which the clips are used need not be steel, but can be made of any suitable material, such as aluminum. The clips themselves may also be made of any suitable material, though steel is preferred because of its strength and relative cheapness. The anchor may be hardened, if desired.

Numerous variations in the details of construction of the clip of this invention within the scope of the accompanying claims, will be apparent to those skilled in the art in the light of the foregoing disclosure. For example, in the embodiment shown in Figure 6, a three-pointed anchor can be produced by cutting the corners of one of the free ends to produce a centrally located sharp point. Such a clip would be effective in only two instead of four directions, however.

Thus, it can be seen that a cheap, simple, efficient, non-piercing insulation clip is provided, which is easy to install, but extremely difficult to remove.

Having thus described our invention what is claimed and desired to be secured by Letters Patent is:

1. A non-piercing metal clip by which sheet material is secured to decking having an open channel with sides sloping convergently toward a closed bottom, said clip having a wide shank with a head extending along and at right angles to the width of said shank, said head being oriented, in use, along the open channel of the decking, said shank having a section of reduced width, in the direction across the head, at its end opposite the said head, and at least three sharp points extending laterally outwardly from said shank at said end opposite the head, at least two of said points being spaced from one another along one side of the decking channel and at least one of said points extending to engage the opposite side of said decking channel.

2. The clip of claim 1 wherein the section of reduced width of the shank is provided by a twist of the shank through approximately ninety degrees.

References Cited in the file of this patent

UNITED STATES PATENTS

| | | |
|---|---|---|
| 2,091,791 | Newman | Aug. 31, 1937 |
| 2,296,046 | Miller | Sept. 15, 1942 |
| 2,327,329 | Murphy | Aug. 17, 1943 |
| 2,369,961 | Gisondi | Feb. 20, 1945 |
| 2,388,968 | Hedgren | Nov. 13, 1945 |
| 2,409,508 | Miller | Oct. 15, 1946 |
| 2,511,808 | Petri | June 13, 1950 |
| 2,515,827 | Howard | July 18, 1950 |
| 2,567,884 | Heath | Sept. 11, 1951 |

FOREIGN PATENTS

| | | |
|---|---|---|
| 57,211 | Switzerland | July 12, 1912 |
| 829,099 | France | Mar. 14, 1938 |